Patented July 2, 1946

2,403,205

UNITED STATES PATENT OFFICE 2,403,205

DIELECTRIC COMPOSITION

Massimo Baer, Plainfield, N. J., assignor to Cornell-Dubilier Electric Corporation, South Plainfield, N. J., a corporation of Delaware No Drawing. Application November 14, 1942, Serial No. 465,632

2 Claims. (Cl. 252—66)

The present invention relates to dielectric compositions and more particularly to liquid dielectric organic compounds.

Various halogenated organic compositions such as chlorinated naphthalene and chlorinated diphenyl have been proposed as dielectrics for transformers, condensers and other electrical apparatus, both for direct use in the form of liquid insulators surrounding the apparatus contained in a suitable container and by impregnating the liquid dielectrics in the porous spaces of a primary insulator, in particular, a fibrous insulator such as paper, textiles, and other materials.

Whereas chlorinated diphenyl as liquid dielectrics have been used with great success in the past, other halogenated compositions, in particular chlorinated naphthalenes, have not been satisfactory due to their poor dielectric and other electrical properties.

An object of the invention is to provide an improved dielectric composition of the above character and a novel method of preparing the same.

A more specific object is the provision of a new process of transforming ordinary liquid chlorinated naphthalenes possessing poor dielectric properties into compositions of high dielectric and other electrical properties.

With the foregoing and other objects in view, as will appear hereafter, the dielectric composition according to the invention comprises substantially a condensation product or polymer of chlorinated naphthalene, in particular the lower chlorinated naphthalenes, and formaldehyde or any other compound generating formaldehyde.

One method of carrying out the invention consists in condensing the lower naphthalenes such as monochloro naphthalene, dichloro naphthalene and trichloro naphthalene or a mixture thereof in various proportions with formaldehyde preferably in the presence of a catalyst. In a preferred embodiment, the catalyst consists of phosphoric anhydride dissolved in 96% sulphuric acid. The presence of this catalyst substantially increases the rate of condensation and was found to be indispensable in mixtures involving large portions of dichloro naphthalene and trichloro naphthalene.

By the employment of the above process, liquid chlorinated naphthalenes which normally possess poor dielectric and other electrical properties may be transformed into naphthalene polymers or resinous condensation products forming high grade liquid dielectric materials.

Among the many advantages and favorable properties of the chlorinated naphthalene polymers obtained by the invention are the following:

A high dielectric constant subject to relatively small variations within a substantial temperature range. According to tests made, the dielectric constants observed were from 4.2 to 4.8 over a temperature range from 20° C. to 100° C. The dielectric constant at 25° C. of impregnated kraft paper was found to be about 5.3.

Another advantage resides in a low power factor for electrical condensers impregnated with the dielectric according to the invention, said power factor being subject to small variations within a substantial temperature range. According to experiments made, the power factor at 1000 cycles was found to range from .2 to .3% at room temperature and from .5 to .6% at a temperature of 100° C.

Another characteristic of the dielectric composition obtained by the invention is due to its high insulation resistance. The latter, according to measurements made, was found to be about 12 megohms per microfarad for a paper condenser employing kraft paper impregnated with the novel dielectric composition according to the invention.

Still another advantage of the new dielectric composition is due to its high breakdown voltage. The latter, according to tests made, was found to be about 3,850 volts in case of direct current for a condenser containing three layers of .003 kraft paper.

There are many other favorable characteristics and advantages of the novel dielectric composition among which are perfect chemical neutrality and stability in alternating current operation.

The above properties and characteristics of the new dielectric composition according to the invention compare favorably and in many respects are superior to those of other chlorinated dielectric materials at present being used as dielectric or insulating compounds such as chlorinated diphenyl and others.

The following is a preferred method, presented by way of example, of practicing the invention.

The reagents or initial ingredients used are as follows:

1. One mol of a mixture of chlorinated naphthalenes, for example a mixture composed of 60% monochloro naphthalene, 30% dichloro naphthalene and 10% trichloro naphthalene;

2. .57 mols of formaldehyde;

3. 96% sulphuric acid in such quantity as to obtain a concentration of 72% sulphuric acid and 28% water; and 4. Phosphoric anhydride, about 9% of the weight of the 96% sulphuric acid used and being dissolved in the acid with the aid of heat if needed.

In carrying out the process, one mol of the mixture of chlorinated naphthalenes is stirred with .57 mols of a 37% solution of formaldehyde and heated to 75° C.

The formaldehyde solution may be a U. S. P. grade containing as active ingredients 37% formaldehyde and as inert ingredients 10% methanol and 53% water. However, any other formaldehyde solution of different concentration may be used if a sulphuric acid concentration of 72% is maintained. Methanol is by no means needed for a successful condensation and serves the purpose to avoid separation of some paraformaldehyde from the solution on long standing.

To this mixture, while being vigorously stirred, is added the acid mixture in small proportions and during an interval of 1.5 hours. The temperature during this period is kept constant at about 78° to 80° C.

By the addition of 96% sulphuric acid in such quantity as to obtain a concentration of 72% sulphuric acid and 28% water is meant that, taking into account the water contained in the formaldehyde solution and the water contained in the 96% sulphuric acid, there is added such a quantity of sulphuric acid as to give a combined concentration of 72% sulphuric acid and 28% water. This does not take into account the final acid concentration which will be reduced by the water produced during the reaction.

As an example, if a formaldehyde solution is used containing 17 grams (37%) of formaldehyde, 4.6 grams (10%) methanol and 24.4 grams (53%) sulphuric acid, making altogether 46 grams of solution, the amount of water X to be added to obtain a combined concentration of 72% sulphuric acid and 28% water will be determined by the following formula:

$$\frac{24.4 + .04X}{X + 24.4} = .28$$

By determining X, it follows that 73 grams of 96% sulphuric acid are required to obtain a final acid concentration of 72%.

When the admixture of the acid has been completed, the mass is stirred for about 3.5 more hours at a temperature of 80° to 85° C. The resinous condensation product or naphthalene polymer formed during the reaction is then separated in any suitable manner, preferably by means of a suitable solvent such as benzene and then neutralized. Thereupon, the solvent is steam distilled and the composition so obtained freed from water and brought to the desired viscosity (higher than 48 seconds Saybolt at 210° F.) by vacuum distilling the most volatile constituents.

The resinous condensation products or naphthalene polymers obtained in the foregoing manner may be further improved and purified by the use of small quantities of activated alumina as an absorbing agent. The composition has a pale yellow color and contains about 65% solid material and 35% volatile material.

While the invention has been described in terms of its specific embodiment, it is to be understood that it is of a broad application and is to be limited only by the scope of the appended claims.

I claim:

1. A method of producing a liquid dielectric which comprises the steps of mixing 1 mol of a mixture of the lower chlorinated naphthalenes with .57 mol of a 37% solution of formaldehyde, heating the mixture to 75° C., stirring the mixture and adding, in small portions, in the interval of about 1.5 hours a solution of 96% sulphuric acid and phosphoric anhydride while maintaining the temperature of the mixture at 78° to 80° C., stirring the mixture for 3.5 more hours at 80° to 85° C. to produce a naphthalene-formaldehyde polymer, and segregating the naphthalene polymer from said mixture.

2. A method of producing a liquid dielectric which comprises the steps of mixing 1 mol of a mixture of 60% monochloro naphthalene, 30% dichloro naphthalene and 10% trichloro naphthalene with .57 mol of a 37% solution of formaldehyde, heating the mixture to 75° C., stirring the mixture and adding, in small portions, in the interval of 1.5 hours a solution of 96% sulphuric acid and phosphoric anhydride while maintaining the temperature at 78° to 80° C., stirring the mixture for 3.5 more hours at 80° to 85° C., and segregating by means of a solvent the naphthalene-formaldehyde polymer formed from said mixture.

MASSIMO BAER.